C. M. BURNS.
Corn-Plow and Marker.
No. 202,985. Patented April 30, 1878.
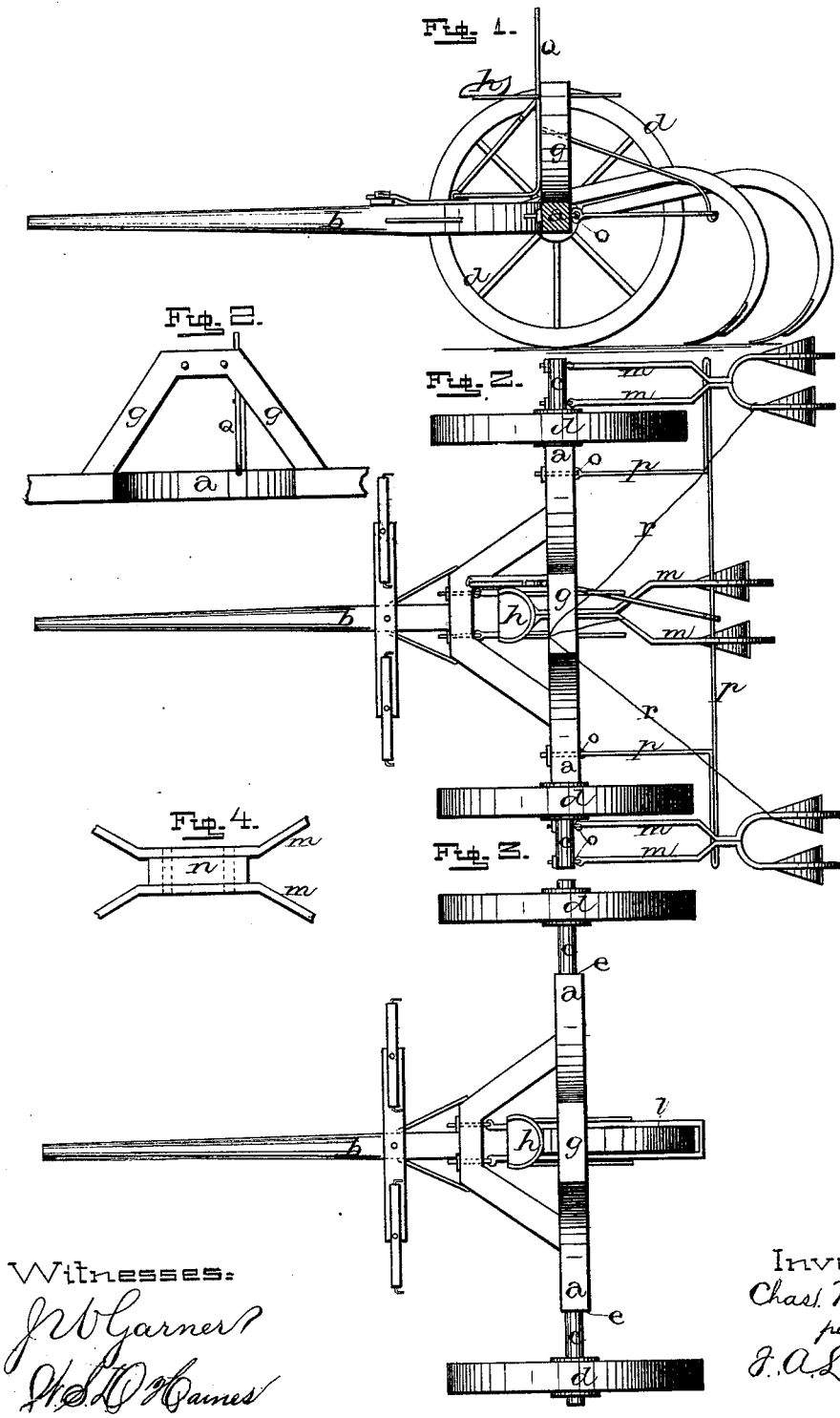
Witnesses:
J. W. Garner
W. S. D. Haines
Inventor:
Chas. M. Burns,
per
J. A. Lehmann,
Atty.

UNITED STATES PATENT OFFICE.

CHARLES M. BURNS, OF HAMLER, OHIO.

IMPROVEMENT IN CORN PLOW AND MARKER.

Specification forming part of Letters Patent No. 202,985, dated April 30, 1878; application filed March 18, 1878.

*To all whom it may concern:*

Be it known that I, CHAS. M. BURNS, of Hamler, in the county of Henry and State of Ohio, have invented certain new and use-useful Improvements in Corn-Plow and Corn-Marker; and I do hereby declare the following to be a full, clear, and exact description of the invention, such as will enable others skilled in the art to which it pertains to make and use it, reference being had to the accompanying drawings, which form part of this specification.

My invention relates to an improvement in corn-plows and corn-markers; and it consists in the arrangement and combination of parts, whereby the land can be laid off in squares and, after the corn has begun to grow, can be used for plowing the same, all of which will be more fully described hereinafter.

The accompanying drawings represent my invention.

$a$ represents the axle, made of one continuous piece of metal, of any suitable shape, size, or construction, and which is bent forward at its center, as shown. To the front side of the bent-forward portion of this axle is secured the tongue $b$, in any suitable manner. The spindles $c$ of this axle are made much longer than is usual, so as to allow the wheels $d$ to be moved outward toward their ends, or nearer together, so that the inner sides of the hubs will rest against the square shoulder $e$. Welded or otherwise secured to the top of this axle, so as to form a bow or curve of any suitable shape over that portion where the axle is bent forward, is the iron bar $g$, through the upper portion of which are made holes for the bolts which support the seat $h$. This seat is made adjustable back and forth, so that the driver can adjust his weight to the machine, and thus balance it so nicely that there will be no weight upon the horses' necks, and make the draft upon the team as light as possible. Passing horizontally through the axle $a$ are a number of hooks, $o$, each one of which is provided with a screw-thread with a nut, so that it can be readily removed when necessary.

When the machine is to be used for laying off the ground ready for planting, the small wheel $l$ will be fastened to the two hooks which pass through the bent-forward portion of the axle, and thus cause the wheel to run along behind the center of the machine.

The two outer wheels being adjusted in the desired position upon the spindles, and the central wheel being left free to move freely up and down, it is evident that all three of the wheels, as the machine is moved across the field, will mark the ground plainly and distinctly, no matter how rough and uneven it may be. The end wheels will, of course, conform to any inequalities of the ground, and the central one, being fully as free as they, will run into hollows, and up over the tops of hills or obstructions, so that no portion of the field will be left unmarked.

After the corn has begun to grow, and it is desired to plow it, the small wheel is removed entirely, the two driving-wheels are moved inward against the shoulders $e$, and the plows are secured to the hooks $o$. By moving the end wheels inward against the shoulders $e$ they will be caused to run inside of the furrow formed by the shovel, and not over the growing corn, as would be otherwise the case.

Each one of these two plows is formed of the two beams $m$, which are so formed as to diverge both at their front and rear ends, as shown.

When it is desired to increase the distance between each pair of the shovels, a wooden block, $n$, may be inserted between them at that point where the beams are bent inward so as to be joined together.

Projecting backward from the axle is the supporting-rod $p$, which passes under all of the beams, and prevents them from entering too deeply into the ground. Connected with this rod $p$ is a lever, Q, which extends up along the side of the driver's seat, and by means of which the beams may be all raised above or lowered to the earth at will. Connected to each pair of shovels is a leather strap, cord, chain, or wire, $r$, by means of which the driver may raise any one pair of the shovels should it be necessary to pass over an obstruction, or should they become clogged in any manner.

By thus bending the axle forward in the middle, as shown, it will be seen that all three of the marking-wheels are on a line with each other, and thus the machine is more easily guided, and kept more fully under the control of the driver, and there will be less draft for the horses.

Having thus described my invention, I claim—

1. In a corn-marker, the axle $a$, bent forward at its center, so that the corn-marking wheel $l$ will be in a line with the other two wheels, substantially as shown.

2. The combination of the axle $a$, bent forward at its center to receive the wheel $l$, in combination with the bar $g$, raised upward at its center just over the top of the curved part of the axle $a$, and secured to the axle, so as to form a part thereof, substantially as described.

In testimony that I claim the foregoing I have hereunto set my hand this 9th day of March, 1878.

CHARLES MORANZA BURNS.

Witnesses:
   DANIEL DUVAL,
   NICHOLAS JACKMAN.